United States Patent [19]

Jenkner

[11] Patent Number: 4,966,271

[45] Date of Patent: Oct. 30, 1990

[54] APPARATUS FOR CONVEYING A TRANSPORT PLATFORM TO A LIFTING TABLE OF A STACKING STATION

[76] Inventor: Erwin Jenkner, Lindenstr. 13, D-7261 Bechingen-Bergwald, Fed. Rep. of Germany

[21] Appl. No.: 424,074

[22] Filed: Oct. 19, 1989

Related U.S. Application Data

[62] Division of Ser. No. 194,679, May 13, 1988, Pat. No. 4,929,147.

[30] Foreign Application Priority Data

May 14, 1987 [DE]  Fed. Rep. of Germany ....... 3716203

[51] Int. Cl.$^5$ ............................................. B65G 47/22
[52] U.S. Cl. .................................. 198/409; 198/836.1; 414/927; 414/781
[58] Field of Search ...................... 198/406, 409, 836; 414/927, 928, 781

[56] References Cited

U.S. PATENT DOCUMENTS

| | | | |
|---|---|---|---|
| 1,590,639 | 6/1926 | Marsh, Jr. ........................ | 198/836 X |
| 1,877,334 | 9/1932 | Lathrop et al. .................... | 198/836 |
| 4,565,129 | 1/1986 | Simeth et al. .................... | 414/927 X |
| 4,613,032 | 9/1986 | Berger et al. .................... | 198/409 |
| 4,696,614 | 9/1987 | Moen ............................... | 414/783 X |

FOREIGN PATENT DOCUMENTS 2084100  4/1982  United Kingdom ................ 198/836

*Primary Examiner*—Robert J. Spar
*Assistant Examiner*—Janice Krizek
*Attorney, Agent, or Firm*—Herbert Dubno

[57] ABSTRACT

The apparatus conveys a transport platform to a lifting table of a stacking station where panels are stacked on the transport platform after the transport platform has been positioned horizontally on the lifting table. For a simple quick transfer an empty transport platform is positioned adjacent the lifting table in a normal position vertical or inclined to vertical and is put on the lifting table located in the receiving position by tipping into one horizontal position. A displacing device can be provided for moving the transport platform in the one horizontal position to another horizontal position in which the panels are received.

14 Claims, 6 Drawing Sheets

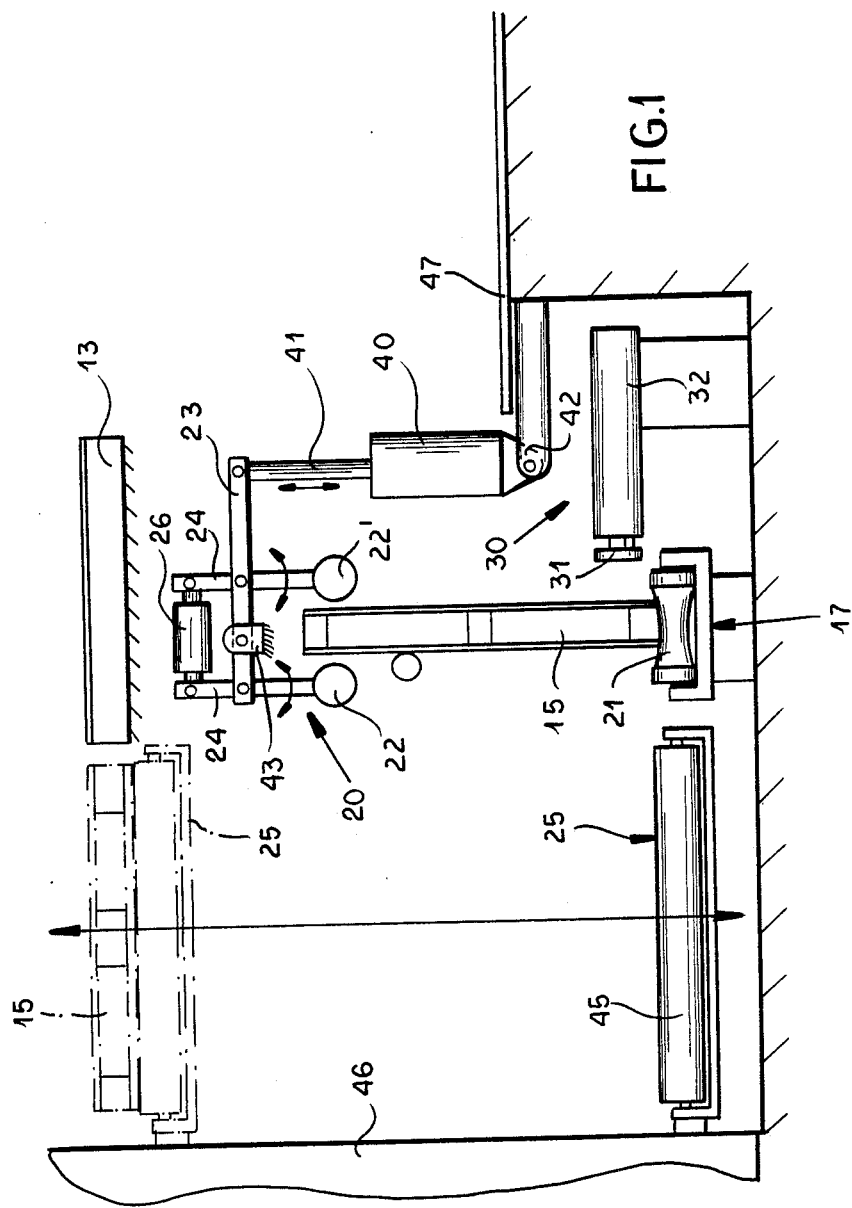

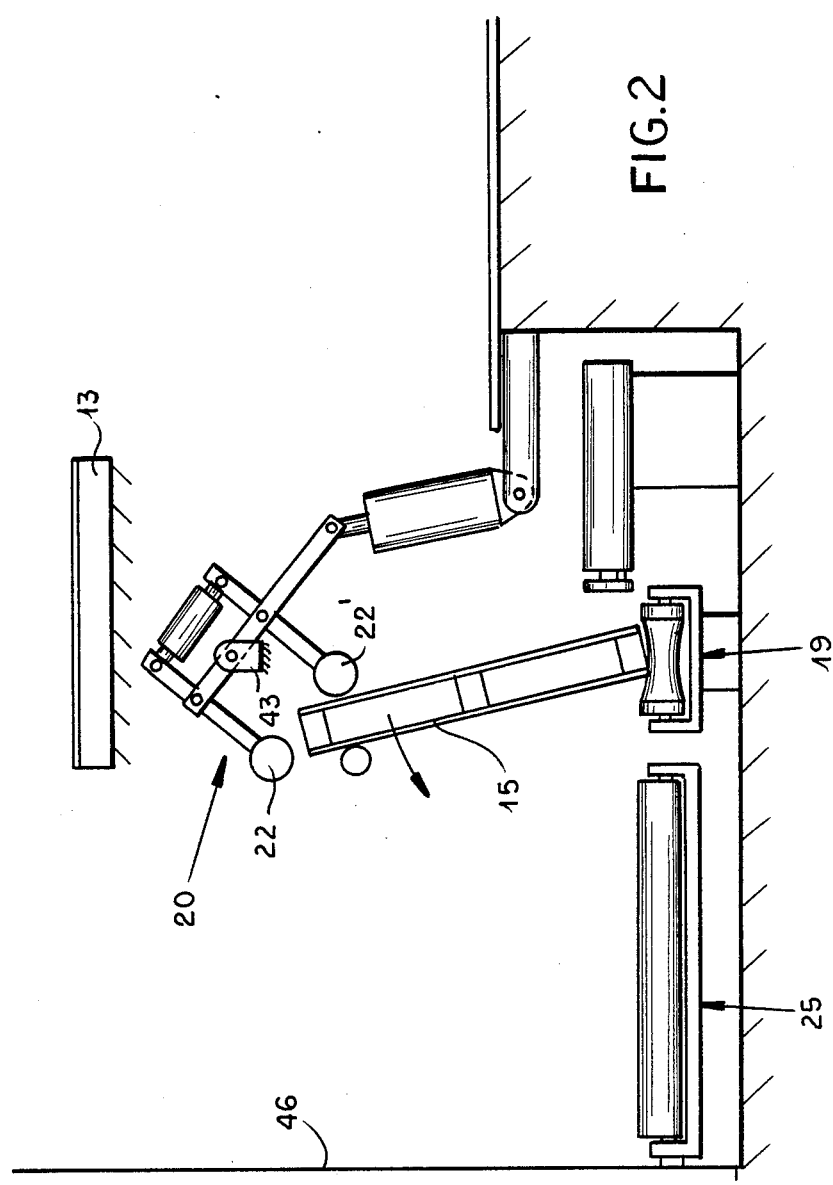

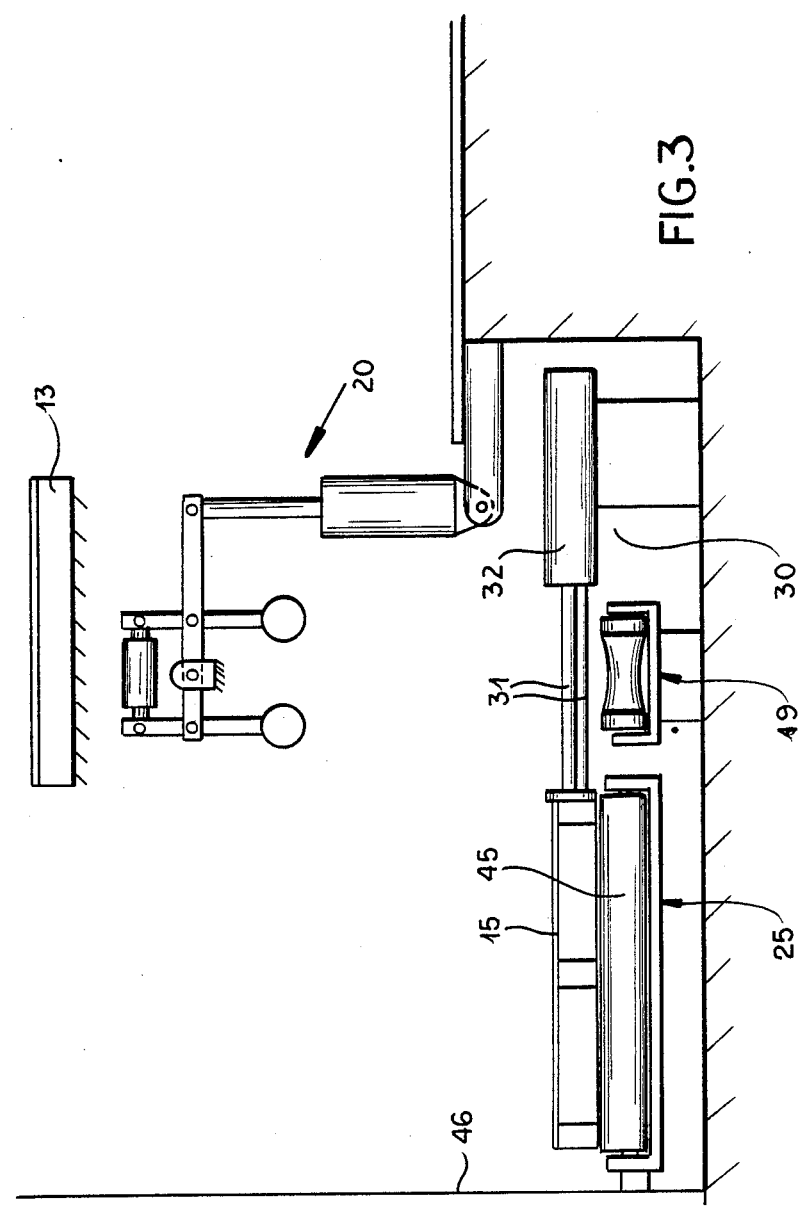

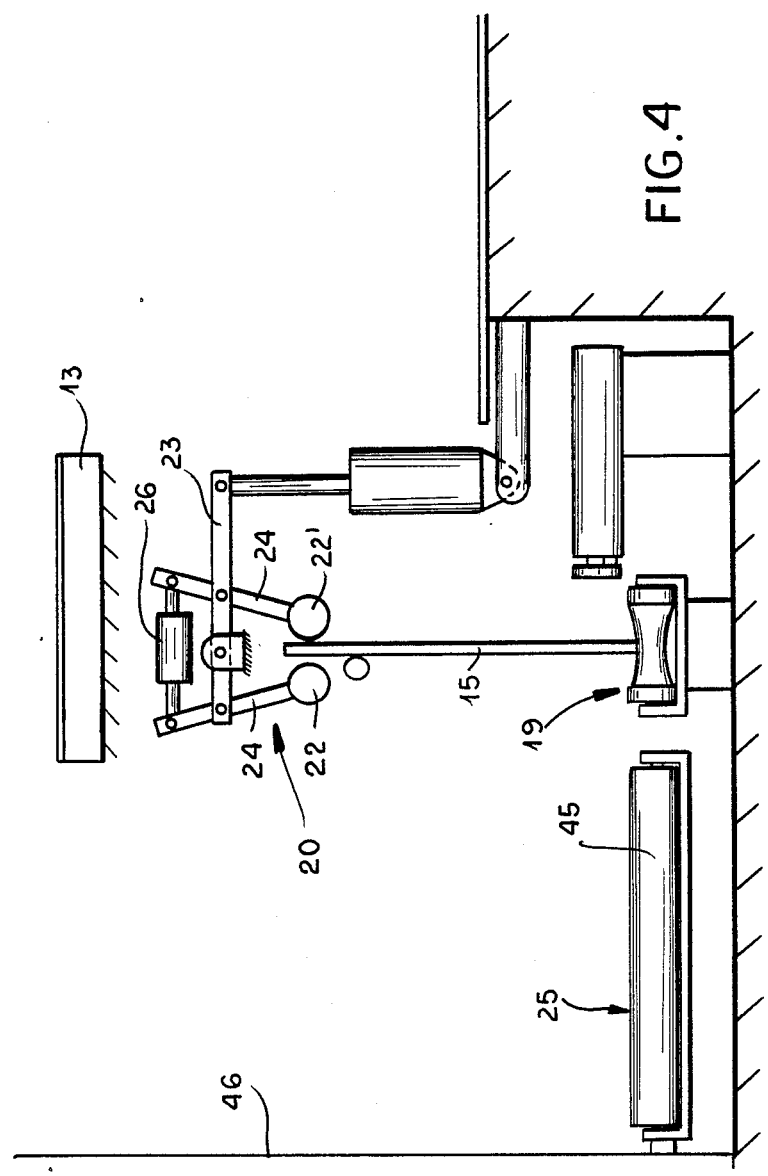

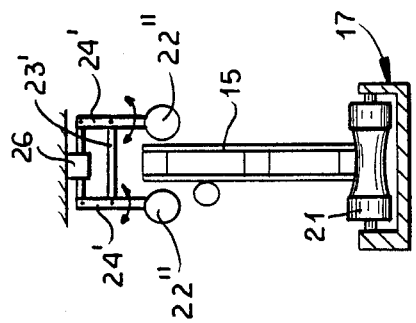
FIG.8
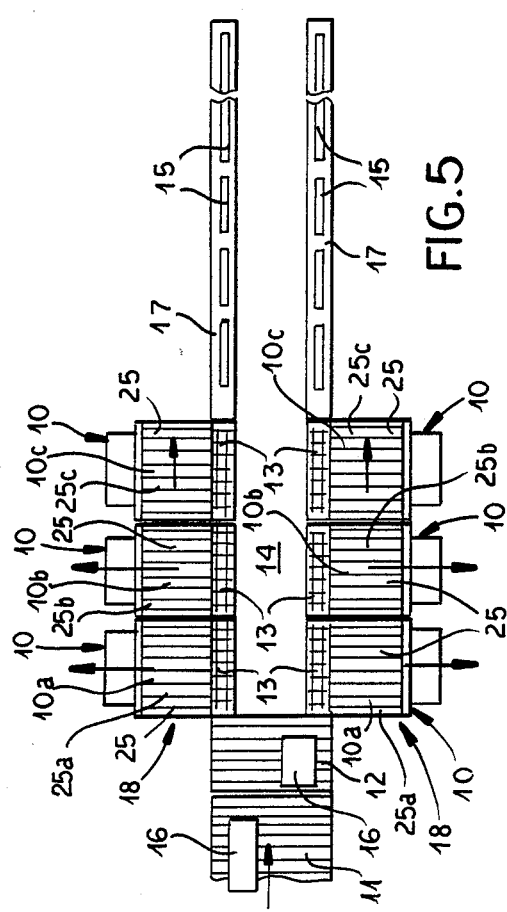
FIG.5
FIG.6

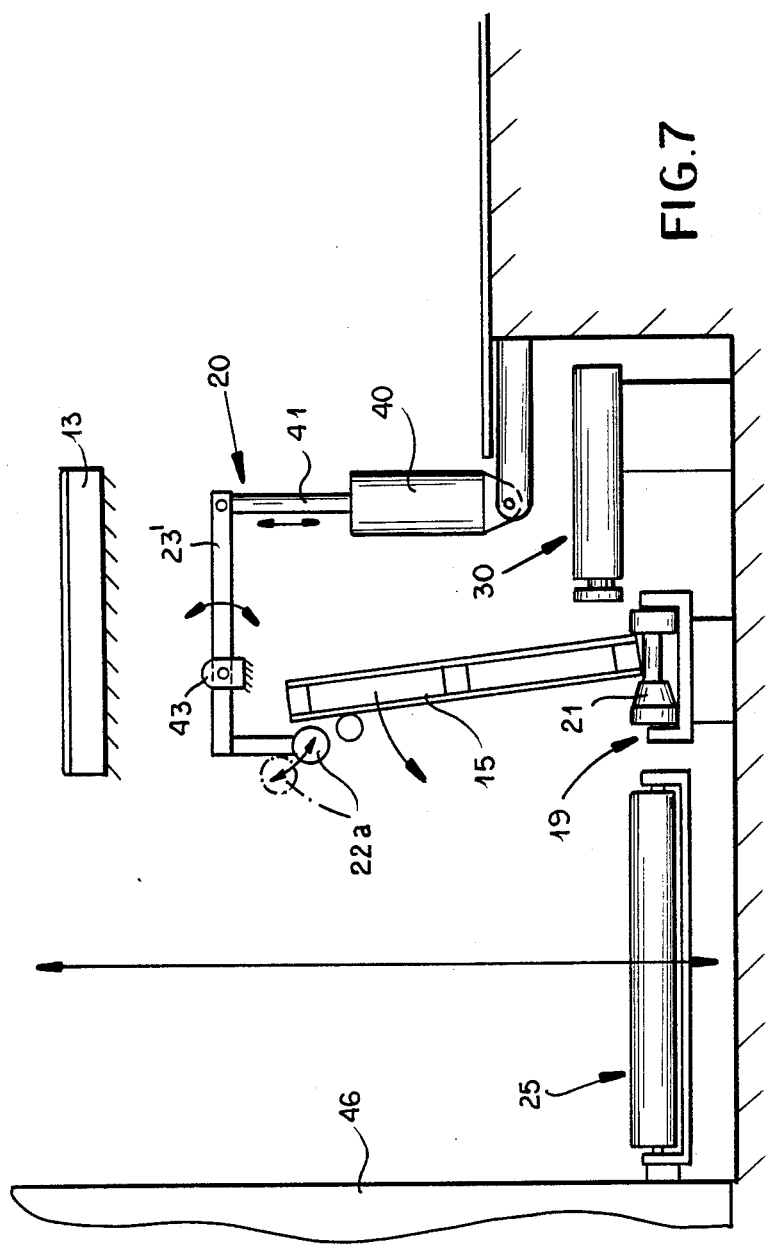

APPARATUS FOR CONVEYING A TRANSPORT PLATFORM TO A LIFTING TABLE OF A STACKING STATION

CROSS REFERENCE TO RELATED APPLICATION

This application is a division of Ser. No. 07/194,679 filed 13 May 1988 and now U.S. Pat. No. 4,929,147 issued on 29 May 1990.

FIELD OF THE INVENTION

My present invention relates to a process and apparatus for transferring a transport platform which is advantageously used to carry a stack of panels, plates or the like to a lifting table of a stacking station. More particularly, the invention relates to the conveying of transport platforms which have an approximately rectangular outline, e.g. a pallet or a panel plate or board, whose length and width are larger than its thickness, a lifting table of a stacking station at which a plurality of panels are stacked on the transport platform oriented substantially horizontally on the lifting table and in a lowered receiving position of the lifting table.

BACKGROUND OF THE INVENTION

Empty pallets or transport platforms are brought to the lifting table of a stacking station and objects to be stacked on the lifting table can be stacked while the lifting table is lowered as is described in German Printed Patent Application DE-AS 20 33 828. It is also known to make large size panels in a so-called panel dividing unit or sawing unit using apparatus as manufactured, for example, by Firma Holzma Maschinenbau GMBH, D-7260 Calw-Holzbronn, Federal Republic of Germany. These units have a longitudinal and a transverse saw for cutting the large size panels into smaller rectangular pieces of different size.

The large size panels are cut up individually or to supply the so-called panel packets or groups of panels. By "rectangular" I mean both square and nonsquare rectangular objects The panels or pieces form similarly rectangular individual panels or panel packets. They must be transferred to the stacking stations after sorting according to size where they are arranged according to size.

Thus a single column of equal size pieces or several columns of equal size or different size pieces can be stacked on the lifting table of such a stacking station which is vertically movable up and down. In the latter case one can speak of a stack of several fixed sizes which also has several columns or individual stacks.

Thus it is known to form a stack on a transport platform on a lifting table. This transport platform can be advantageously a pallet or a so-called panel blank or finishing plate, which could previously have been mounted on the lifting table, e.g. by hand. Then after the stacking together with the stack carried by the transport platform it can be taken from the lifting table. The stack can then remain on the transport platform, for subsequent transport until it is taken from it again.

A pallet or other transport platform generally has an approximately rectangular outline and of course both a square or nonsquare rectangular periphery and its length and breadth measured in its horizontal position is substantially larger than its vertical thickness or height. The problem of transferring a transport platform to a lifting table in a simple and economically efficient way which allows a partial or complete automating has up to now not been solved satisfactorily, especially for the case in which several stacking stations are positioned side by side in a row with small spacing or without spacing.

OBJECTS OF THE INVENTION

It is an object of my invention to provide an improved process and apparatus for conveying a transport platform to a lifting table of a stacking station which it avoids problems encountered in prior art techniques.

It is also an object of my invention to provide a process and apparatus for conveying a transport platform to a lifting table of a stacking station which is partially or completely automatic.

It is another object of my invention to provide a process and apparatus for conveying a transport platform to a lifting table of a stacking station which is partially or completely automatic and permits a rapid conveying of an empty transport platform in an efficient economical manner.

It is an additional object of my invention to provide a process and apparatus for conveying a transport platform to a lifting table at a stacking station which is partially or completely automatic but permits a rapid conveying of an empty transport platform in a simple economical manner, especially when a plurality of transport platforms must be transferred to several stacking stations positioned beside each other in a row in which these stacking stations are spaced from each other with only small spacing or without spacing.

SUMMARY OF THE INVENTION

These objects and others which will become more readily apparent hereinafter are attained in accordance with my invention in a process for conveying at least one transport platform having an approximately rectangular outline, which can be a pallet or plate, whose length and width is larger than its thickness, to at least one lifting table of at least one stacking station on which a plurality of panels are stacked on the transport platform oriented substantially horizontally on the lifting table, advantageously while lowered.

According to my invention an empty transport platform located in a normal position adjacent the lifting table either vertical or inclined to vertical is put on the lifting table located in a receiving position by tipping into one horizontal position.

These objects are also attained in an apparatus for conveying at least one transport platform to at least one lifting table of at least one stacking station for stacking a plurality of panels fed to the stacking station.

According to my invention this apparatus has a retaining device adjacent the stacking station for holding the transport platform in a normal position either vertical or inclined to vertical and further means are provided for bringing the transport platform held by the retaining device in the normal position into one horizontal position on the lifting table of the stacking station located in a predetermined receiving position by tipping.

The process according to my invention and the apparatus transfer to perform it allow a rapid transfer of transport platforms to one or more stacking stations. It is also applicable when several stacking stations are positioned in a row, but only when these stacking stations are positioned one beside another with only small spacing or without any spacing. Also the apparatus for performing the process according to my invention can be connected subsequently without problems to the already existing panel dividing machine and/or alternating variegated sawing unit with associated sorting devices.

If an apparatus not according to my invention is used it may not be connectable to the sawing unit or dividing machine easily. Then the existing units would have to be completely rebuilt. By contrast, only easily performed changes are required when the space for the feed devices for feeding the empty transport platforms is already present normally.

Also apparatus which performs the process according to my invention needs only comparatively little floor space since the transport platforms are conveyed on edge to the lifting table so that only a conveyor of comparatively small width is needed. Thus the feeding of the transport platforms to the stacking stations can occur advantageously under a panel feed table positioned locally fixed adjacent the lifting table and advantageously from the same side of the stacking station from which the panels to be stacked are transferred to the stacking station.

This process is particularly suited to stacking stations which are originally associated or subsequently associated with the alternating variegated sawing unit with associated sorting devices, in which a panel dividing machine or a sawing unit has a longitudinal saw and a transverse saw which cuts or saws large size panels or panel packets into pieces of different size.

Then these pieces sorted according to size are stacked on the transport platform mounted on the lifting table. These stacks of panels can be used to make pieces of furniture. Other applications are possible.

This process according to my invention is particularly well suited for stacking stations in which stationary feed tables, which one can designate as panel feed tables, are positioned adjacent the lifting table at a height equivalent approximately to its uppermost height.

These panel feed tables can be air cushion tables on which the pieces to be stacked, i.e. the panels or panel packets to be stacked, are transferred automatically or by hand and from which these built up stacks can be transferred to transport platforms positioned on the lifting tables.

One can then bring the empty transport platforms under the feed table into a normal position aligned with the vertical or inclined to the vertical to the lifting table involved and then, when the lifting table is located in its lowest position, the transport platform is brought to the lifting table from which the stack previously formed there together with the transport platform supporting it had been conveyed and then the new empty transport platform is put on it.

This has a number of advantages.

To build a stack the lifting table is lowered stepwise from an upper or its uppermost position according to the growth of the stack so that the uppermost side of the uppermost stacked panel is located at the height of the feed table for transfer of the next panel or the next panel packet.

When the lifting table arrives in a predetermined lower, advantageously its lowest, position, the formation of the stack is ended and it is conveyed away together with the transport platform supporting it from the lifting table, e.g. to an additional driven roller conveyor or directly by a forklift stacker or truck or the like from the lifting table.

One then can, without changing the position of the lifting table, bring a new empty transport conveying platform in its normal vertical position or inclined to vertical to this lifting table automatically so that no unnecessary time is lost because no height adjustment of the lifting table is required.

The transport or conveying platform is positioned ahead of the lifting table in a vertical (erect) position or a position inclined to the vertical. From this position it is transferred to the lifting table by tilting of the transport or conveying platform into a horizontal orientation, e.g. under its own weight.

Also the invention permits a single feed conveyor to be associated with a plurality of stacking stations positioned side by side in a row. Then transport platforms at a position already vertical or inclined to the vertical on this feed conveyor can be put in a position advantageously in the vertical or inclined to the vertical in which they are located also in their normal position adjacent the lifting table so that these feed conveyors of the transport platforms require only a little space.

The feed conveyor can be of such a length that it supports the transport platform with its small side and also in its normal position adjacent the lifting table and one or more additional conveyors can be aligned with the feed conveyor which supports the transport platform in its normal position adjacent the lifting tables.

The conveyor or the conveyors which act for feeding the transport platform to the stacking stations can be roller conveyors. However also other conveyors, e.g. driven conveyors with endless conveyor belts or the like, can be used.

The automatic conveying of the transport platforms in the normal position adjacent the lifting tables of the stacking stations is effected advantageously by moving the transport platforms in the normal position vertical or inclined to the vertical. They can then be held by one or more supporting members of a supporting means, advantageously lateral guides, in their normal position vertical or inclined to the vertical.

The transport platforms can contact these supporting members or lateral guides. These lateral guides can advantageously be sliding guides, e.g. one or more rods, rails or the like. However they can also be movable guiding members, e.g. pivotally mounted rollers positionable in a fixed position or endless belts guided about guide rollers or the like. These belts or rollers or the like need not be driven since they serve only for lateral support of the transport platform.

Advantageously the transport platforms can be inclined at an angle of 0 to 30° to the vertical adjacent the lifting table involved on which they are deposited by tipping. Advantageously they are put at such an angle that they are located in a position in which they can tip by themselves to the lifting table by falling as soon as the supporting means holding them in this position is moved away from it. It is required then to support only one end of the transport platform in its normal position and if necessary also on the conveyor or conveyors acting of this normal position of the platform.

It is however also possible to change its position during the automatic feeding of its conveyor in the normal position adjacent the lifting table, e.g. to change its inclination to the vertical during its transport to one or more of the driven conveyors. Shortly before its arrival at the stacking station involved it can be inclined to the vertical during transport to the stacking stations just so far that it falls on the lifting table in a free fall after the supporting means retaining the transport platform in position are moved away.

Tipping of the transport platform from its normal position, while the platform is continuously supported, can be effected until it arrives almost entirely or completely on the lifting table.

Advantageously the transport platform, when it is transferred from its normal position adjacent the lifting table to one initial horizontal position by tipping, is automatically pushed by an automatic displacing device or positioning means from this initial horizontal position into another horizontal position in which it receives the panels or stacks of panels. The displacing device can have one or more linearly adjustable push rods or struts which are movable advantageously by a piston-and-cylinder unit. However it can be also moved in another way, e.g. by a toothed bar drive, a rack or the like. Also other possibilities exist for alignment of the transport or conveying platforms on the lifting table by one or more pivotally supported driven levers.

The invention is also applicable to a stacking station whose lifting tables are movable horizontally to transfer stacks formed on it to the transport of the roller conveyor or the like guiding the stack. These lifting tables are then returned again to their normal position where the stacking, can proceed on them.

This is possible when one or more stacking stations are arranged side-by-side in a row so that the transfer of the stack formed on one stacking station is completely independent of the other stacking station. Then immediately after return of the lifting table to its normal position an empty transport or conveying platform can be mounted on it and then again a new stack can be begun.

The process according to my invention particularly allows a rapid exchange of a transport or conveying platform carrying a stack on a lifting table of a stacking station with a new empty transport platform.

BRIEF DESCRIPTION OF THE DRAWING

The above and other objects, features and advantages of my invention will become more readily apparent from the following description, reference being made to the accompanying highly diagrammatic drawing in which:

FIG. 1 is a side elevational view of a stacking station with one embodiment of the apparatus according to my invention for conveying empty pallets or plates to it;

FIG. 2 is a partial side elevational view of the apparatus shown in FIG. 1 in which a pallet begins to tip directly to the lifting table of the stacking station;

FIG. 3 is a partial side elevational view of the apparatus shown in FIG. 1 in a configuration in which the platform mentioned above falling on the lifting table is pushed into a predetermined final horizontal position on the lifting table;

FIG. 4 is a partial side elevational view of the apparatus shown in FIG. 1 which is changed to convey a thin plate instead of a thick pallet;

FIG. 5 is a top view of two rows of stacking stations arranged parallel to each other which act for stacking of rectangular panels of different size sawed on an alternating variegated sawing unit in which the individual stacking stations can be formed according to the apparatus shown in FIGS. 1 to 4;

FIG. 6 is a magnified top view of a row of stacking stations in front of the lifting table of the individual conveyor belts associated with an apparatus according to FIG. 5;

FIG. 7 is a side elevational view of another embodiment of the apparatus according to my invention for conveying empty pallets or blank panels to it; and FIG. 8 is an enlarged cross sectional view through the apparatus shown in FIG. 6 taken along the section line 8—8 in FIG. 6.

SPECIFIC DESCRIPTION

In the plant according to FIG. 5 rectangular panels or groups of panels 16 subdivided in an alternating variegated sawing device from large size panels are fed to stacking stations 10 arranged in two rows 18 sorted according to size where they are stacked.

The columns of panels and/or stacks of panels of the same size are arranged with equal edges over each other. Here two rows 18 are shows with three stacking stations 10 immediately adjacent each other however the number of rows and stacking stations can be less or greater.

A powered roller conveyor 11 which connects to a multicomponent wide air cushion table 12 (which in turn is connected to the smaller feed tables 13 which can be air cushion tables also) leads to these stacking stations 10. The smaller feed tables 13 are positioned approximately at the height of the highest positions of the lifting tables 25 at the stacking stations 10.

A service passage 14 is located between the rows of the smaller feed 13 which accommodates a worker or workers who convert the panels or groups of panels 16 fed from the roller conveyor 11 and the air cushion table 12 to the stacking stations 10 by the smaller feed tables 13 to the lifting tables 25 into the stacks sorted according to size on the lifting tables 25.

If a complete panel stack which can comprise one or more columns of panels is formed on a lifting table 25 and if a stack of a fixed size or a stack of more than one predetermined size is made, then this stack is carried away by the lifting table 25. This is effected when this lifting table 25 is in a lowered position, advantageously in its lowest position in which each of the stacks is positioned on a conveying platform 15 which generally is a pallet or a blank panel as is commercially available as a support or to protect the lowest member of the stack. The use of such panels for a sawing unit is known.

It should be clear that initially an empty conveying platform 15 is placed upon an empty lifting table 25, that then the conveying platform is stacked with plates, boards or panels 16, and that, only after stacking has been completed, is the conveying platform 15 with its stack displaced from the respective lifting table 25 so that the latter is again empty to receive another empty conveying platform 15 on which another stack of plates, boards or panels 16 can be built.

The conveying of the stack from the lifting table 25 is effected in a known way. For example these lifting tables 25 can have driven roller conveyors which can feed the stack formed on them to one or more additional driven roller conveyors or to a conveying carriage. Alternatively it can be conveyed in some other way.

In this embodiment the lifting tables 25a and 25b can be extended horizontally from the stack station rows 18 for delivery of the stack and then the stack can be taken away by unshown roller conveyors or the like and it can be fed from the lifting table 25c directly in the direction of the arrow to the unshown additional roller conveyor.

After conveying of the conveyor platform 15 with its stack of plates, boards or panels 16 thereon from a lifting table 25, the lifting table returns into its upper position stations 10a and/or 10b and can be provided again with an empty conveying platform 15. Since the lifting table 25c can not travel horizontally, it can immediately be provided again with an empty conveying platform 15 after each stack delivery.

The unit shown in FIG. 5 has a driven or powered roller conveyor 17 for this purpose for each row of stacking stations 18. The roller conveyor 17 ends directly in front of the rear most stacking station 10c of this row 18. The rollers 21 of the roller conveyor 17 are driven and can have the rotationally symmetrical form seen in FIGS. 1 or 7.

Adjacent each of the three stacking stations 10a to 10c which form one of the rows 18 a driven individual roller conveyor 19 is positioned below each feed table 13 and spaced from it.

Each individual roller conveyor 19 can operate with the same principle as the driven feed roller conveyor 17. In fact the driven rollers 21 can be exactly the same as those used in the feed roller conveyor 17. Each conveyor 17 and 19 is engageable and disengageable according to choice for feeding the transport platforms 15.

In FIG. 6 the individual roller conveyors 19 indicated with the reference characters 19a, 19b, 19c for the transport platforms 15 are illustrated schematically as associated with one row 18 of stacking stations 10a to 10c.

In the embodiment according to FIGS. 1 to 4 the transport platforms 15 are conveyed in an approximately vertical orientation both on the feed roller conveyor 17 and also on the individual roller conveyors 19 where they sit with their lower small ends approximately vertical on the deep middle portion of the driven rotationally symmetrical rollers 21 and are kept from tipping over by the supporting members (22, 22a, 22' and 22") in the provided position. These supporting members comprise the lateral guides 22, 22', 22" extending horizontally and parallel to the feed direction of the transport platforms 15 which prevent them from tipping and extend adjacent the upper ends of the transport platforms 15. The spacing of these lateral guides 22, 22' and/or 22", 22" from each other can be adjusted to fit different thicknesses of the transport platforms 15 (FIGS. 1 to 3) and the plates 15 (FIG. 4) which is effected in the embodiment according to FIGS. 1 to 4 and 8 since these lateral guides 22, 22' and/or 22", 22" are mounted on levers 24 and/or 24' held rotatably on a transverse rod 23 and/or 23'.

The levers can be adjusted by an adjusting motor 26 and act on the upper ends of the platforms 15 facing the guide rods.

The lateral guides 22, 22' positioned above each individual roller conveyor 19 which extends approximately over the length of the associated individual roller conveyor 19 can be moved for tipping and release of the transport platform 15 by a piston-cylinder-unit 40 whose lower end is rotatable on a stationary support 42 and whose piston rod 41 is joined pivotally to the transverse rod 23 which is pivotally mounted on a stationary support 43 as is illustrated.

Thus the lateral guides 22, 22' can be swung from the base configuration shown in FIGS. 1, 3 and 4 into the pivoted configuration shown in FIG. 2 by pulling or drawing in the piston rod 41. The transport platform 15 held between both lateral guides 22, 22' is then swung or pivoted by the one lateral guide 22' and the other lateral guide 22 is swung away from the path of the transport platform 15 so that it now drops on the roller conveyor 45 of the lifting table 25 and locates itself then in one horizontal position on this roller conveyor 45.

At this point however it has not taken its final other horizontal position on this driven conveyor 45. It is pushed into its other horizontal position by two push rods 31 of a displacing device 30 which is associated with the front end of the piston rod of a pneumatic or hydraulic piston-and-cylinder unit 32.

In FIG. 3 these push rods 31 have pushed a platform 15 into its other final horizontal position on the roller conveyor 45 of the lifting table 25. Then the push rods 31 are retracted and the lifting table 25 travels up into the position indicated with dot-dashed lines in FIG. 1 where the stacking on the transport platform 15 is begun.

When the desired stack height is attained which is normally the case when the lifting table 25 raisable and lowerable vertically by a lifting device 46 carried on it is lowered into its lowest position, then the platform 15 is conveyed from the lifting table 25 with the stack carried by it.

Previously a new empty platform 15 or plate 15 was brought into the initial position shown in FIGS. 1 to 4 and it is tipped now by pivoting the lateral guides 22, 22' again on the roller conveyor 45 of the lifting table 25 and then is brought into the provided final other horizontal position on this lifting table 25 by the push rods 31 and then the process can begin again with the next stack of panels 16.

The feed of the transport platforms 15 to the individual roller conveyors 19 and thus into their final position on them from which they then tip toward the lifting tables 25 can be described as follows:

On the right end of each of the feed roller conveyors 17 loading stations are located where empty conveying platforms 15 can be mounted one after the other, e.g. by an operator or automatically.

After each mounting of a transport platform 15 on a feed roller conveyor 17 it is switched on long enough until the transport platforms 15 located on it are conveyed further for a distance equal to the length or somewhat more than the length of the transport platform 15 and a transport platform 15 is started on its way on the end of the feed roller conveyor 17 involved. It is assumed that no transport platform 15 is located on the individual roller conveyors 19 adjacent the stacking stations 10 One can then feed empty transport platforms 15 to each individual roller conveyor 19 by appropriately switching on and off the feed roller conveyors 17 and the individual feed roller conveyors 19. Thus each individual roller conveyor 19 feeds another individual roller conveyor 19 positioned in front or downstream of it in the feed direction of the transport platforms 15. It also feeds transport platforms 15 to the individual roller conveyors 19 following it. In this way transport platforms 15 can be positioned in their normal positions on all the individual roller conveyors 19 and then as described previously tipped to the lifting tables 25 and oriented on them. One can then immediately convey a new empty transport platform 15 to an empty individual roller conveyor 19 and leave it on it in its normal position until the associated lifting table 25 can be emptied and then the new empty transport platform is tipped on it. This empty transport platform is located thus in its normal other horizontal position at this stacking station 10. With control means comprising a suitable programmable controlling unit or computer the feed of the transport platforms to the individual conveyors, their halting in the provided normal position and their tipping to the lifting table and their alignment on it can be performed automatically.

When a lifting table 25 has emptied at a chosen stacking station 10 and an empty transport platform 15 tipped to it, the process of stacking on it can be started. Thus the state of the other stacking stations can be arbitrary, e.g. all the other stacking stations can be simultaneously stacked. When at an arbitrarily chosen stacking station, the associated individual roller conveyor has emptied, a new empty transport platform 15 in its normal position can be transferred immediately to it which automatically is effected by appropriate drive of the feed roller conveyor 17 and as the case may require its individual roller conveyor or conveyors and their drives which are associated with it.

Each empty individual roller conveyor 19 can be supplied by an individual roller conveyor 19 positioned in front of it and/or by the feed roller conveyors 17 positioned in front of it directly with a transport platform 15 so that a transport platform can be supplied to all the individual roller conveyors 19.

The normal position of a transport platform 15 on an individual roller conveyor 19 can be signaled or determined by its arrival at a raisable and lowerable contact S o by light barrier control or in other ways. The contact S can be a leaf spring which is pushed aside when the transport platform 15 falls to the lifting table 25.

When for example a transport platform 15 could be tipped on the lifting table 25 associated with it from the individual roller conveyor 19a of a row 18 which is furthest upstream in the transport direction of the transport platforms, then this most upstream individual conveyor roller 19a is supplied with a new transport platform 15 by the feed roller conveyor 17. When the middle individual roller conveyor 19b of a row 18 was emptied by tipping of a transport platform 15 found on it to the associated lifting table 25, then an empty transport platform 15 is transferred from the upstream individual roller conveyor 19a and this upstream individual roller conveyor 19a then is supplied by the feed roller conveyor 17 with a new transport platform 15, and so forth. All this can take place under automatic program control and/or state control.

It is also possible to bring the transport platform 15 extraordinarily quickly and simply to the lifting tables 25 of the stacking stations 10. Since the individual roller conveyors 19 and the retaining devices 20 associated with them for the transport platforms 15 mounted on them are located entirely or substantially below the feed tables 13 located at these stacking stations 10, the service passage 14 is not restricted by the supply of the transport platforms 15 between these feed tables 13.

In the embodiment according to FIG. 1 the piston-and-cylinder unit 32 extends below the feed table 13 and lies in a depression at the bottom of the machine room above a grate 47 located there which serves as a floor for access to this service passage 14. Most importantly no space in the service passage 14 is consumed for the feed of the transport platform 15.

All conveyors or roller conveyors 17 and 19 associated with a stacking station row form a linear row in which these roller conveyors connect to each other for delivery of the transport platforms 15. The transport of the transport platforms 15 always goes in the same direction.

The retaining device 20 according to FIG. 7 corresponds to that according to FIGS. 1 to 4 with a single difference, namely that the transport platforms 15 suitably inclined to the vertical on the roller conveyor or conveyor belt 17 and/or 19 by a single lateral guide 22a for each conveyor are maintained so that they, when they are located in their normal position adjacent a lifting table 25, already are inclined in a direction on the lifting tables 25 so that they after guiding away the horizontal lateral guide 22a associated with the individual roller conveyors 19 fall into the dot-dash position on the lifting tables 25 by their own weight.

In such an inclined position the transport platforms 15 can be held on the feed roller conveyor 17 so that this feed roller conveyor 17 then likewise only requires one lateral horizontal guide rod to prevent the dropping of the transport platform located on it.

In transport of the transport platform to the conveyor belt the transport platform leaning on the guide rod with its broad side slides on this guide rod. The lateral guide 22a associated with the feed roller conveyor 17 can be fixed in position. Each individual roller conveyor 19 is associated with its own single lateral guide 22a which can be moved from the position indicated with solid lines to the position indicated by dot-dashed lines by an adjusting motor 40 formed as a piston-cylinder-unit. When the lateral guide 22a is in the position indicated with the dot-dashed lines the transport platform 15 is released to fall on the lifting table 25. After tipping a transport platform 15 supported laterally by it onto the appropriate lifting table 25 then this lateral guide 22a is then returned into its completely extended normal position and the next transport platform 15 can be brought to this individual roller conveyor 19.

The rollers of the roller conveyors 17 and 19 are formed so that the rollers 21 are protected against lateral slipping by a gradation on each roller 21 with their small sides abutting on the transport platform. It is also conceivable to secure them from lateral slipping in another way, for example by additional guide rods or the like associated with the rollers 21. The device according to FIG. 7 requires no adjustment for transport platforms of different thicknesses.

The transport platforms 15, which are transferable to the lifting table 25 by the feed units, can as shown have different thicknesses. Also their width and length can have different limits. The size of the panels to be stacked on it can have any size less than a certain maximum size.

By "rear" stacking station or end of the apparatus I mean that end to which the transport platforms 15 are fed.

By definition the "supporting members" referred to previously and in the following are part of the "supporting means" referred to in the following.

By "retaining device" I mean the parts of the apparatus which hold the transport platform adjacent the lifting table in its normal position vertical or inclined to vertical.

By "stop device" in the following claims I mean the "supporting means" or the "lateral guides" for the transport platform.

I claim:

1. In an apparatus for conveying at least one transport platform to at least one lifting table of at least one stacking station for stacking a plurality of panels fed to said stacking station, the improvement which comprises:

a retaining device positioned adjacent said stacking station for holding said transport platform in a normal position either vertical or inclined to vertical;

means for bringing said transport platform held by said retaining device in said normal position into horizontal position on said lifting table of said stacking station located in a predetermined receiving position by tipping, a first conveyor disposed and constructed to feed said transport platform to a row of said stacking stations; and at least one other conveyor for conveying or transferring said transport platform in said normal position adjacent one of said stacking stations.

2. The improvement as defined in claim 1 wherein a displacing device is provided to transfer said transport platform tipped into said horizontal position on said lifting table of said stacking station into another horizontal position on said lifting table, said displacing device having at least one automatically movable push rod.

3. The improvement as defined in claim 2 wherein said apparatus has a plurality of said stacking stations and each of said stacking stations is associated with two of said push rods, which are movable by an associated piston-and-cylinder unit.

4. The improvement as defined in claim 1 wherein said retaining device has a supporting means which provides lateral support of said transport platform located in said normal position adjacent said lifting table and which has at least one supporting member which is movable into a position allowing said tipping.

5. The improvement as defined in claim 1 wherein a respective one of said other conveyors is positioned adjacent each of said stacking stations of said row of said stacking stations and said other conveyors are positioned in succession in a linear array prearranged to receive selectively said transport platform delivered by said first conveyor which feeds said transport platform to said stacking stations.

6. The improvement as defined in claim 1 wherein said transport platform is conveyable when empty on said first conveyor either in a vertical orientation or an orientation inclined to vertical, a small side of said empty transport platform resting on said first conveyor which comprises a roller conveyor and said transport platform is being prevented from falling by a supporting member.

7. The improvement as defined in claim 1 wherein at least one of said other conveyors is a driven conveyor.

8. The improvement as defined in claim 7 wherein said driven conveyor is a one of said roller conveyor.

9. The improvement as defined in claim 8 wherein said roller conveyor has a plurality of rollers with rotationally symmetrical surface regions which contact said transport platform and formed so that said transport platforms is prevented from laterally slipping from said rollers.

10. The improvement as defined in claim 1, further comprising control means for automatic control of conveying of said transport platform in said normal position and for tipping said transport platform to said lifting table.

11. The improvement as defined in claim 1 wherein a feed table located adjacent a displacement path of said lifting table at said stacking station is fixed in position at a predetermined height at which said panels are brought to said lifting table; and said retaining device for holding said transport platform in said normal position at said stacking station is so constructed and positioned that said retaining device keeps said transport platform in said normal position under said feed table.

12. The improvement as defined in claim 11 wherein said retaining device is designed to hold transport platforms of different thicknesses.

13. An apparatus for conveying at least one transport platform to a lifting table of a stacking station in a row of said stacking stations for stacking a plurality of panels fed to said stacking stations comprising:

a roller conveyor which can feed said transport platform to the vicinity of said stacking stations having one supporting means for holding said transport platform in a normal position vertical or inclined to vertical and comprising a plurality of rollers whose rotationally symmetrical surface regions which contact said transport platform are so formed that said transport platforms are prevented from laterally slipping;

at least one other roller conveyor for conveying or transferring said transport platform in said normal position adjacent each of said stacking stations;

a feed table adjacent the displacement path of said lifting table at said stacking station fixed in position at a predetermined height at which said panels to be stacked are brought to said lifting table;

a retaining device adjacent each of said stacking stations for holding said transport platform in said normal position either vertical or inclined to vertical, said retaining device having another of said supporting means which provides lateral support of said transport platform located in said normal position adjacent said lifting table and which has at least one supporting member which is movable into a position allowing or causing tipping of said transport platform, said transport platform held by said retaining device in said normal position being brought into one horizontal position on said lifting table of said stacking station located in a predetermined receiving position by tipping;

a displacing device having two automatically movable push rods movable by an associated piston-and-cylinder unit to transfer said transport platform tipped into said one horizontal position on said lifting table of said stacking station into another horizontal position on said lifting table; and a control means for automatic control of said conveying of said transport platform in said normal position, of tipping said transport platform to said lifting table and of transferring said transport platform to said other horizontal position.

14. An apparatus for conveying at least one transport platform to a lifting table of a stacking station in a row of said stacking stations for stacking a plurality of panels fed to said stacking stations comprising:

a roller conveyor which can feed said transport platform to the vicinity of said stacking stations having one supporting means for holding said transport platform in a normal position vertical or inclined to vertical and comprising a plurality of rollers whose rotationally symmetrical surface regions which contact said transport platform are so formed that said transport platforms are prevented from laterally slipping;

at least one other roller conveyor for conveying or transferring said transport platform in said normal position adjacent each of said stacking stations;

a feed table adjacent the displacement path of said lifting table at said stacking station fixed in position at a predetermined height at which said panels to be stacked are brought to said lifting table;

a retaining device adjacent each of said stacking stations for holding said transport platform in said normal position either vertical or inclined to vertical, said retaining device having another of said supporting means which provides lateral support of said transport platform located in said normal position adjacent said lifting table and which has at least one supporting member which is movable into a position allowing or causing tipping of said transport platform, said transport platform held by said retaining device in said normal position being brought into one horizontal position on said lifting table of said stacking station located in a predetermined receiving position by tipping;

a displacing device movable by an associated driving unit for transferring said transport platform tipped into said one horizontal position on said lifting table of said stacking station into another horizontal position on said lifting table; and a control means for automatic control of said conveying of said transport platform in said normal position, of tipping said transport platform to said lifting table and of transferring said transport platform to said other horizontal position.

* * * * *